United States Patent
Husby

(10) Patent No.: US 7,610,440 B2
(45) Date of Patent: Oct. 27, 2009

(54) CONTENT ADDRESSABLE MEMORY WITH AUTOMATED LEARNING

(76) Inventor: Donald E. Husby, 20711 NW. Rockspring La., Beaverton, OR (US) 97006

( * ) Notice: Subject to any disclaimer, the term of this patent is extended or adjusted under 35 U.S.C. 154(b) by 720 days.

(21) Appl. No.: 10/279,154

(22) Filed: Oct. 23, 2002

(65) Prior Publication Data

US 2004/0083337 A1    Apr. 29, 2004

(51) Int. Cl.
*G06F 12/02*    (2006.01)

(52) U.S. Cl. ...................... 711/108; 365/49.1

(58) Field of Classification Search .............. None
See application file for complete search history.

(56) References Cited

U.S. PATENT DOCUMENTS

| | | | |
|---|---|---|---|
| 5,805,855 A | | 9/1998 | Liu |
| 5,818,873 A | * | 10/1998 | Wall et al. ............. 375/240 |
| 5,842,040 A | | 11/1998 | Hughes et al. |
| 6,181,699 B1 | | 1/2001 | Crinion et al. |
| 6,289,414 B1 | * | 9/2001 | Feldmeier et al. ........ 711/108 |
| 6,374,326 B1 | | 4/2002 | Kansal et al. |
| 6,467,019 B1 | | 10/2002 | Washburn |
| 6,484,170 B2 | | 11/2002 | Abdat |
| 7,124,200 B2 | * | 10/2006 | Sato et al. ............. 709/239 |
| 2002/0126672 A1 | | 9/2002 | Chow et al. |
| 2002/0163909 A1 | | 11/2002 | Sarkinen et al. |

OTHER PUBLICATIONS

McAuley, A.J.; Francis, P., "Fast routing table lookup using CAMs," INFOCOM '93. Proceedings.Twelfth Annual Joint Conference of the IEEE Computer and Communications Societies. Networking: Foundation for the Future. IEEE, vol., no.pp. 1382-1391 vol. 3, 1993.*
Azgomi, Sherri, Using Content-Addressable Memory for Networking Applications, http://www.csdmag.com/maing/1999/11/9911feat3.htm, Nov. 1999, printed Dec. 1, 2000, 11 pages.

* cited by examiner

*Primary Examiner*—Gary J Portka
(74) *Attorney, Agent, or Firm*—Schwabe, Williamson & Wyatt, P.C.

(57) ABSTRACT

A Content Addressable Memory (CAM) architecture is disclosed wherein at least part of an access key is unconditionally written to a CAM memory location. This unconditional writing is performed while accessing a set of CAM memory locations for the purposes of matching the access key. This writing is performed regardless of whether a match to the access key is found.

25 Claims, 11 Drawing Sheets

| 0x4 | 0x5 | 0x0000 | TCP Protocol ID |
|---|---|---|---|
| | 16 bit ID | Flag | Fragment Offset |
| TTL | | Protocol | Checksum |
| | 210 --- 32 Bit Source Address | | |
| | 220 --- 32 Bit Destination Address | | |
| 230 - 8 Bit Source Port Num. | 240 - 8 Bit Destination Port Num. | | |

| 0x4 | 0x5 | 0x0000 | TCP Protocol ID ||
|---|---|---|---|---|
| 16 bit ID ||| Flag | Fragment Offset |
| TTL || Protocol | Checksum ||
| 210 --- 32 Bit Source Address |||||
| 220 --- 32 Bit Destination Address |||||
| 230 - 8 Bit Source Port Num. | 240 - 8 Bit Destination Port Num. ||||

Figure 2

CONTENT ADDRESSABLE MEMORY WITH AUTOMATED LEARNING

FIELD OF THE INVENTION

The present invention relates to the fields of memory devices and networking. More specifically, the present invention relates to the design of content addressable memories, and their applications to networking equipment.

BACKGROUND OF THE INVENTION

Content Addressable Memories (CAMs) are special memory devices that allow for rapid location of data based upon a "query pattern". FIG. 1 shows a prior art embodiment for a Content Addressable Memory (CAM) device. In a CAM, valid data in a storage location 122 of the CAM has associated with it an address 124 in the CAM. In a typical CAM operation, a query pattern is provided to the CAM via an input port 110. This query pattern is latched in a comparand register 120. All storage locations are concurrently accessed from bus 130 and data in each storage location are compared to the value in the comparand 120. If a matched storage location is found, a flag is asserted on the output of the appropriate storage location 140. This, in turn, causes the match port 150 on the CAM to be asserted and the address 124 associated with the matching storage location 122 to be placed on an output bus 160. In certain applications, there are frequently matches to more than one storage location. CAM output selection logic 170 is used to prioritize outputs. In such a multiple match case, the CAM output selection logic 170 can output the appropriate matching address based on a predetermined scheme. If there is no match, then various actions can be taken as appropriate for the host system.

Because of a CAM's inherent ability in conditionally retrieving data, CAM devices are widely used in a number of applications (e.g. networking) where such a feature is needed. However, in many applications, the conditions on which one selects data changes dynamically and frequently, perhaps even in real time. For example, in networking, initially prior to the establishment of a connection between a client and a server, one might access a CAM to route the traffic based on the destination server only (e.g. to a "load balancing" server). However, upon allocation of a particular server to service the connection of the client, it would be desirable to be able to route the traffic based on the attributes, such as network addresses, of the particular server and the client. Thus, there may be a rule for handling traffic to the load-balancing server and a separate rule for handling traffic to the particular server handling a specific connection.

Under conventional CAM usage, typically a network processor is required to re-program the conditions that govern the operation of the CAM for such a condition. With today's data rates of 10 Gigabits, and an average 40 octet datagram, a new datagram arrives every 32 nanoseconds. Thus, every 32 nanoseconds a new datagram will require access to the CAM bus for, as an example, route processing. Allowing access to the CAM bus by the network processor, for the purposes of writing a new rule to handle a specific connection, will likely result in a delay in the processing of a subsequently arriving datagram. The need for the arriving datagram to wait for processing is due to the usage of the CAM bus by the network processor in writing the new rule. While packets may be delayed in processing as described, depending on various factors, the delay may imply that arriving datagrams will be lost if there is no queuing and the arriving datagrams are simply dropped.

Accordingly, an improved CAM without at least some of these disadvantages is desired.

BRIEF DESCRIPTION OF THE DRAWINGS

FIG. 2 illustrates a datagram header processed by an embodiment of the present design.

DETAILED DESCRIPTION OF THE INVENTION

Figure 1:
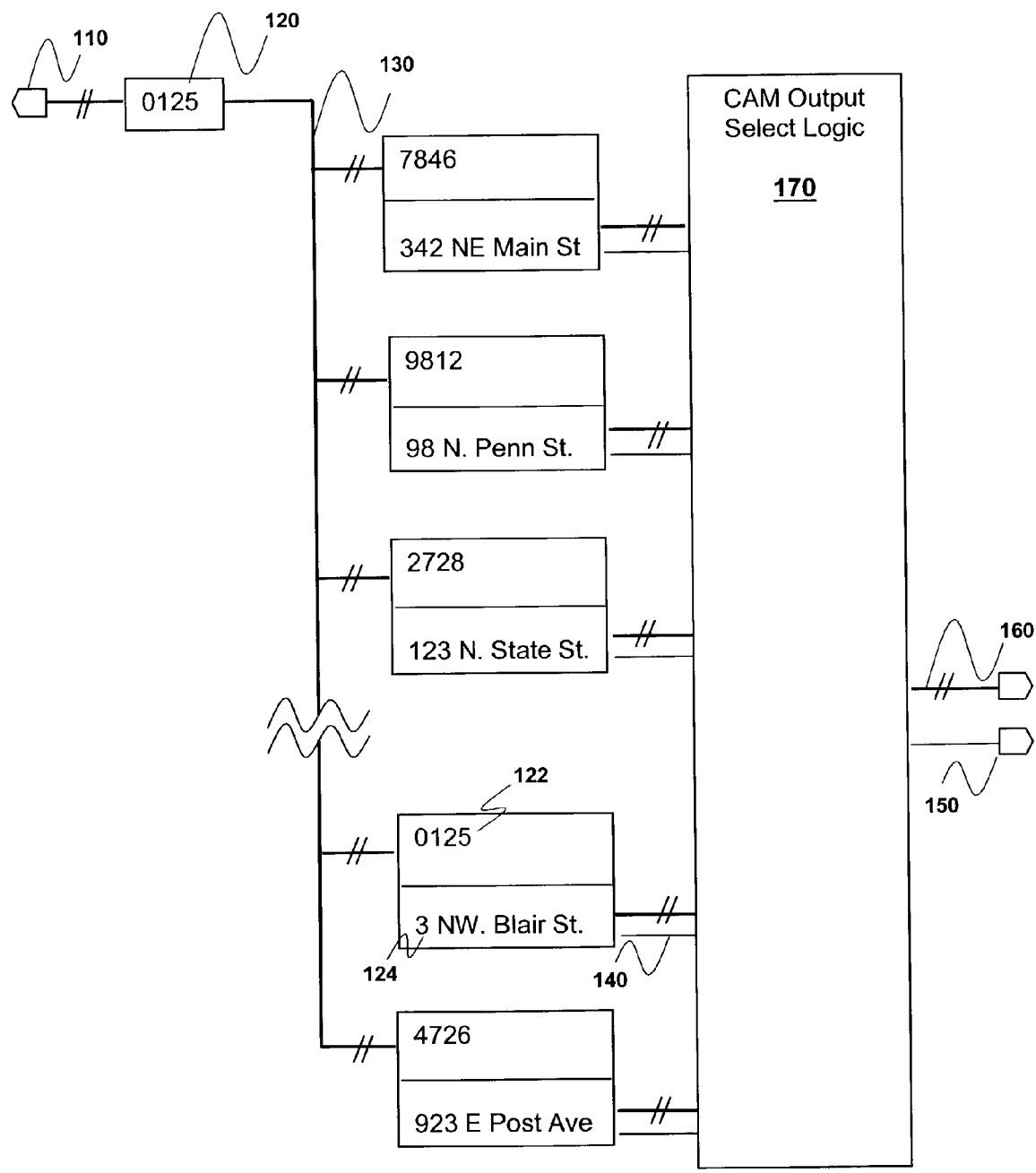
FIG. 1 (Prior Art) illustrates an example of CAM functionality.

In the present invention, a novel method for advantageously improving the performance of a CAM supporting a network switching fabric by utilizing a novel automatic learning function is disclosed. In the description to follow, various aspects of the present invention will be described. For purposes of explanation; specific numbers, materials and configurations are set forth in order to provide a thorough understanding of the present invention. However, the present invention may be practiced without some of these details. Similarly, the use of section headings is merely to assist in the understanding of the present invention. They are not to be construed as imposing any particular organization limitations on the present invention. In some instances, well-known features are omitted or simplified in order not to obscure the present invention.

Various operations will be described as multiple discrete steps, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

When a quantum of information is sent between two end nodes in a network environment, a source and a destination identifier will generally accompany this quantum of information. Refer now to FIG. 2, wherein an example showing typical information accompanying a quantum of information is provided, when this information is transferred between host devices using the Internet Protocol version 4 (IPv4). This information forms a "header" that is to accompany the quantum of information. The header contains various aspects of information about the quantum of information and header, separate and collectively, including information on source and destination hosts and ports. Thus, the IP header is attached to the quantum of information, or payload, forming an IP datagram. For ease of understanding, the present invention will be described with primary/frequent references to such IP datagrams. However, the presently described technology is not so limited, it may be practiced in a wide range of applications where conditional retrieval of data is practiced.

Refer now again to FIG. 2. An 80-bit field, containing the source address 210, destination address 220, and source 230 and destination 240 port numbers of a TCP/IP datagram, may be used as an access key, or a rule, for datagram processing. Thus, this rule can be used to access information, such as routing information, relating to the processing of the corresponding IP datagram. For example, a rule that matches all 80 bits of the address/port information can be used to identify a packet as belonging to a previously existing connection or data exchange. A match for this class of rule would cause a datagram to be processed in a context that was previously established for that connection. This class of rule may be referred to as a connection rule.

Other rules that exist in the same CAM may match only a portion of the 80-bit key. Such a rule might match only the destination address, but not the port numbers or source address. This class of rule is a more general rule and thus would not be matched if a more specific rule, such as a connection rule, matches all 80 bits of a query. This class of more general rule, a "routing rule", without a more specific rule match, would identify a datagram as the start of a new connection. Thus, a routing rule match absent a connection rule match indicates to a network processor that a new context for the new connection is to be created and that a new connection rule, to identify subsequent packets, is to be created.

In addition to routing rules and connection rules classes, other rule classes are also possible. For example, a rule class may exist to identify packet fragments as belonging to a particular packet. In one embodiment, the rule's class is simply a function of its address within the CAM. In another embodiment, a small number of bits, such as a "validation code" to be discussed further below, can be associated with each rule to identify its class.

Figure 3:
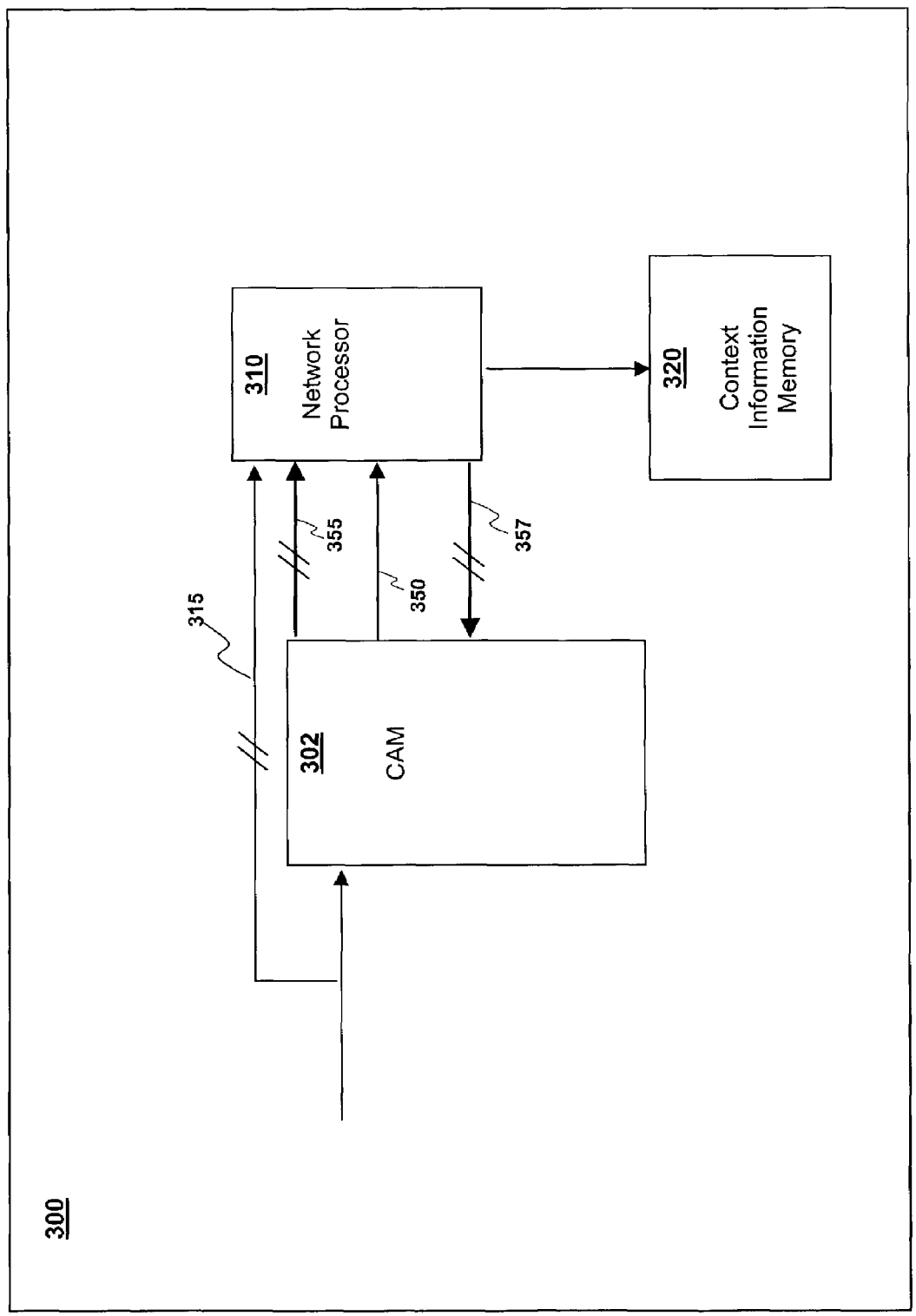
FIG. 3 illustrates a CAM utilizing one embodiment of the present invention.

FIG. 3 illustrates a network integrated circuit 300 containing a CAM 302, in accordance with one embodiment. In this embodiment, an IP datagram's header information 315 is concurrently sent to a network processor 310 and a CAM 302. CAM 302 identifies the proper rule information by reading the appropriate portions of the IP datagram's header information as described above with respect to FIG. 2. As discussed below, CAM 302 will assert a match flag 350 when the rule identified with the IP datagram matches a rule of the CAM. In addition, a pointer 355 to a location in content information memory 320 is provided to network processor 310. This pointer 355 provides an indicia of a location in the context information memory 320 of context information to be used by network processor 310 when processing the IP datagram associated with matched rule. When a newly written rule is to be kept, as described below, a validation code 357 is sent back to the CAM 302.

Figure 4A:
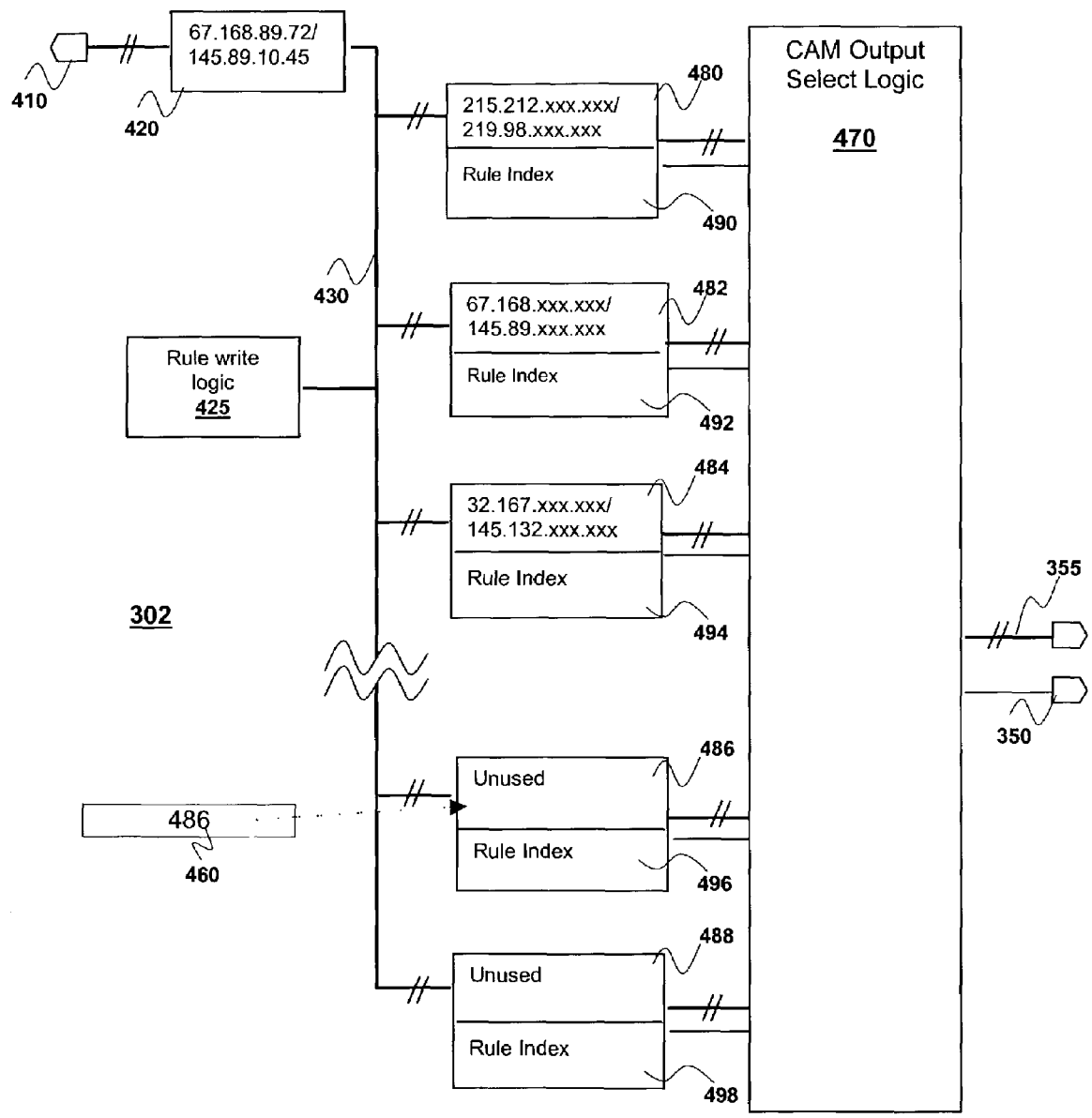
FIGS. 4A and 4B illustrate a forwarding engine of a switch based router containing a CAM implementing an embodiment of the present invention.

FIG. 4A illustrates a CAM 302 in accordance with one embodiment. As previously discussed, CAM 302 contains storage locations 480-488 for storing rules. At a given time, certain storage locations contain valid rules 480-484 while other storage locations 486-488 are not in use. Each valid rule in a storage location 480-484 has associated with it a rule index 490-494. As previously mentioned, a rule index is used to provide an indicia 355 into a storage location in a context information memory 320.

In this embodiment, 64 bit source/destination IP addresses 210/220 are used as a rule, or access key. Rule information is obtained via input port 410 and latched into comparand register 420. The latched rule is then compared against all locations with valid rules 480-484. When a new datagram arrives, for which there is no existing connection, the source/destination pair will match a routing rule 482. In this embodiment, the address 492 of the matching routing rule 482 in the CAM is used as the rule index. As previous mentioned, the rule index is used as an indicia of the location in the context information memory 320 of context information corresponding to the appropriate datagram. In another embodiment, a rule index 490-494 for each storage location 480-484 is written to the CAM device by the network processor 310 at a CAM initialization time. In another embodiment, a rule index 490-494 is written in real time by the network processor 310 as context information is stored in the context information memory 320.

In various embodiments, each rule 480-484 will have associated with it execution context information. In one embodiment, memory 490-494 in the CAM associated with each rule 480-484 contains a pointer to context information. In another embodiment, memory 490-494 in the CAM associated with each rule 480-484 contains the context information. This is advantageous when the quantity of context information is small and the time that would be required to access a secondary memory device, such as a context information memory 320, is critical. In one embodiment, the address in the CAM device operates as the context pointer.

The context information provides details of how a datagram corresponding to a rule is to be handled. In one embodiment, context information contains an indication of the output port on the routing device through which the datagram is to be routed. In another embodiment, context information additionally contains a decrypting key for decrypting a datagram prior to placing it on the output port. In one embodiment, context information contains indicia of which of a number of network processors will process the corresponding datagram.

Referring again to the matched routing rule 482, the corresponding rule index 492 is provided to a network processor 310 in the network integrated circuit 300 (e.g. a forwarding engine) of a switch based router. The matching of a routing rule provides an indicia that there is no information on a connection corresponding to the provided rule 420, e.g. that no connection rule exists. Thus implying that a new context for a new connection needs to be set up. In such a case, the network processor 310 performs steps in accordance with an established policy for setting up new connections. In one embodiment, this includes developing context information and writing this information to a context information memory device 320. In addition, in a prior art device, one of the steps for setting up the new connection will be to write a new rule to a next available memory location 486 in the CAM for this source-destination address combination. Note, however, that writing a rule to a next available memory location requires the network processor 310 to utilize the CAM bus 430. The usage of the CAM bus 430 to write a new rule, separate from an initial processing of the new datagram as described above, will result in an attempt to access a resource, the CAM bus 430, which is already at a very high utilization.

Figure 4B:
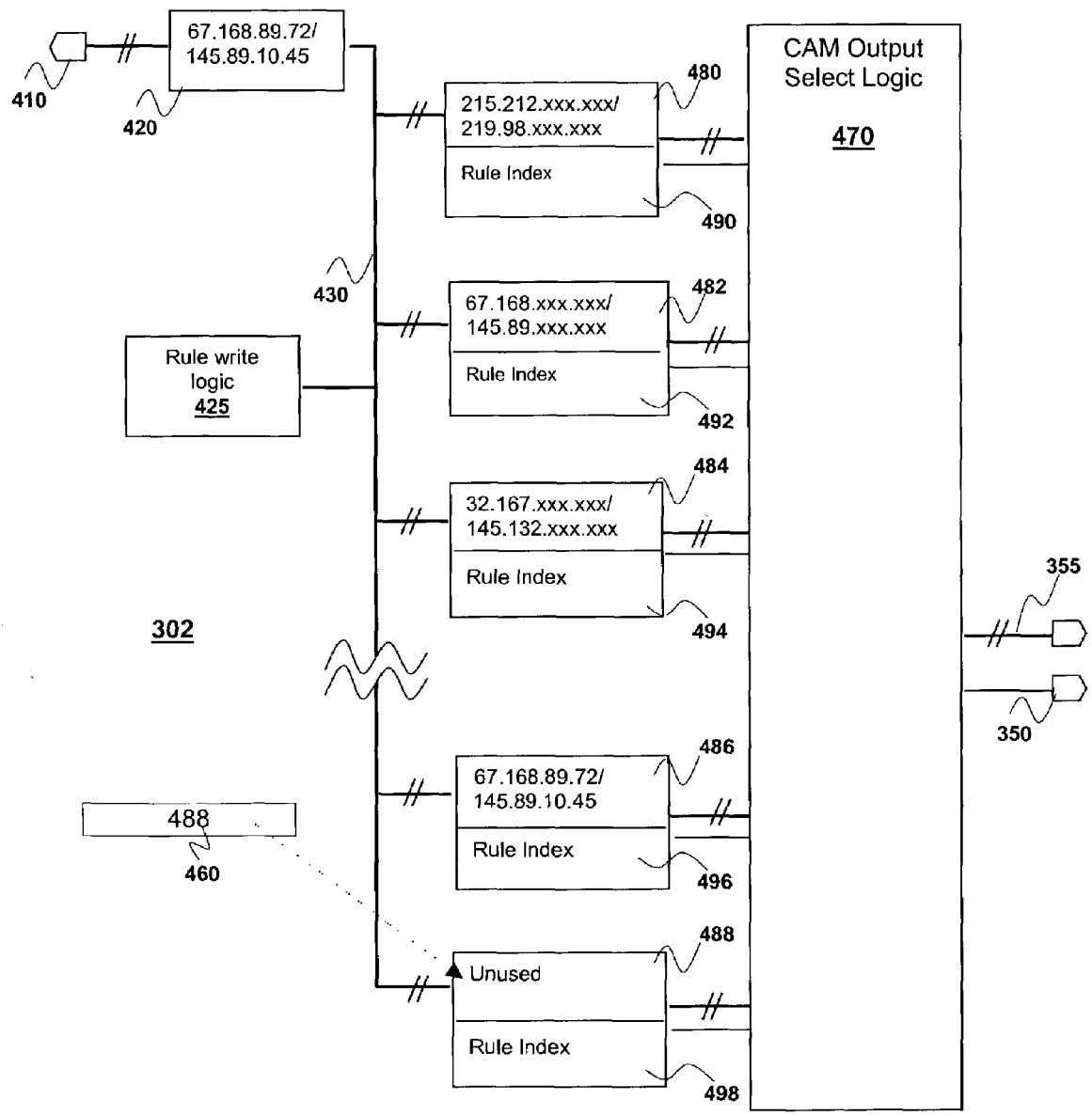
Figure 10:
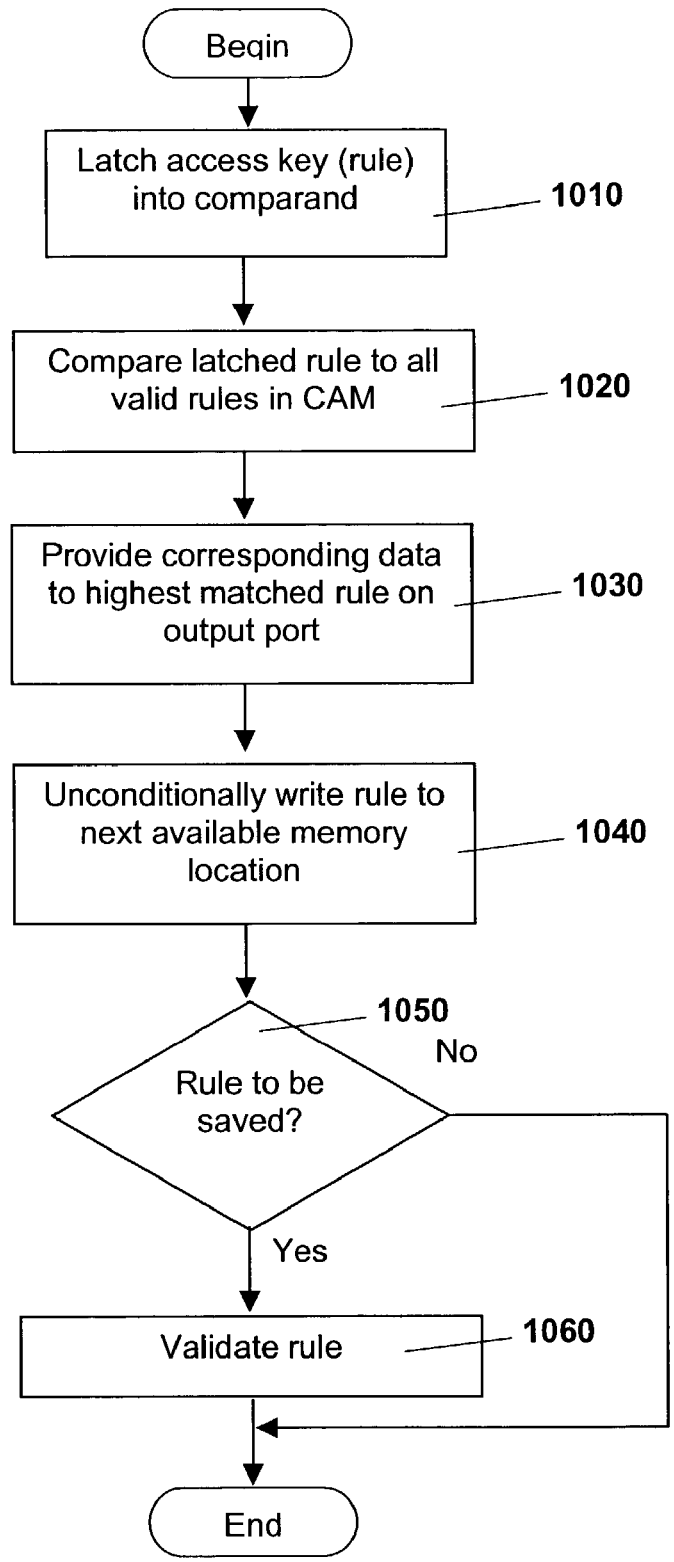
FIG. 10 illustrates a flow diagram for processing a rule, in accordance with one embodiment.

Thus, it is desirable, when writing a new rule, to not employ the CAM bus when there is a possibility of contention for the CAM bus. FIG. 10 illustrates a flow diagram for processing a rule, in accordance with one embodiment. Refer now again to FIG. 4A. In one embodiment, when the access key appears on inputs to CAM device 410, it is latched into the device in the comparand register 420, as in block 1010, and each valid memory location 480-484 performs a comparison against the comparand to determine if there is a match, as in block 1020. In this embodiment, depending on whether there is a match, a match flag is set or cleared on the output 350 of the CAM device 302. In the case of a match, the address corresponding to the rule containing the longest prefix match is placed on the output 355 of the CAM device 302, as in block 1030. and each valid memory location 480-484 performs a comparison against the In addition to the comparison of the rule to the existing rules for a match, however, and unlike the prior art implementations, additional rule write logic 425 in the CAM 302 causes a new rule to be unconditionally formed, and the new rule to be stored, as in block 1040. In one embodiment, a new rule is a rule that is generated from the value in the comparand. This new rule is generated by rule write logic 425 of CAM 302. For example, rule write logic 425 may specify that a new rule is to be a connection rule and thus the rule to be written will be the entire 64 bit source/destination IP address. The newly, unconditionally formed rule is then written to a next available storage location 486 in the CAM. In one embodiment, the next available memory location is indicated by a pointer 460. In one embodiment, this is effectuated through the employment of a pointer 460 to the next available memory location that is "forward" adjusted when the potential new rule is stored 488, and "backward" adjusted when the rule is to be validated 486. For example, a list of memory locations available for writing is kept in a list format. When a memory location is written to in accordance with the present discussion, the pointer is modified to point to the next available memory location. When it is determined that the rule is not to be validated, the listed is modified again by adding the address back to the list. The results of the write operation described above can be seen in FIG. 4B. In another embodiment, the "new" rule is not validated as the rule 360 is written. In this embodiment, the determination of whether a rule is to be validated is used to "forward" adjust the next available memory location at a subsequent time, as discussed below. Thus, a determination is to be made as to whether a rule is to be saved, as in block 1050 and, if it is to be saved, the rule is then validated, as in block 1060.

Determination of whether a rule is needed is performed by a validation process. As previously alluded to, after a rule is written by the CAM, and the next available memory location 486 is automatically adjusted to point to the next free location 488, a determination needs to be made as to whether the new rule is to be kept, e.g. validated. In one embodiment of the present invention, the CAM device is programmed to perform a validation operation, one effect of which is to readjust the free memory pointer 460 as appropriate. In this embodiment, if there is an exact match to an existing connection rule, then the newly written rule is not to be kept and the CAM will not validate the written rule. This can be accomplished by resetting the free memory pointer to indicate that the location just written to is available. In another embodiment, the non-validation will occur by not setting a validation bit. If, however, no matching connection rule exists, the CAM will automatically validate the rule. Thus, the CAM 302 itself will perform the validation without interaction with external devices. In other embodiments, other logic in the system will perform a determination of validation and provide the proper validation code to the CAM 302. In another embodiment, the indication of whether to keep a particular written rule is provided by a network processor 310. In the case where the CAM 302 determines which rules are to be kept, the determination of which rules to validate must be provided to the CAM. In one embodiment, the determination of requirements for rules to be kept is written when the CAM 302 is configured at device startup. In another embodiment, the determination is updated periodically by the network processor 310.

Figure 5:
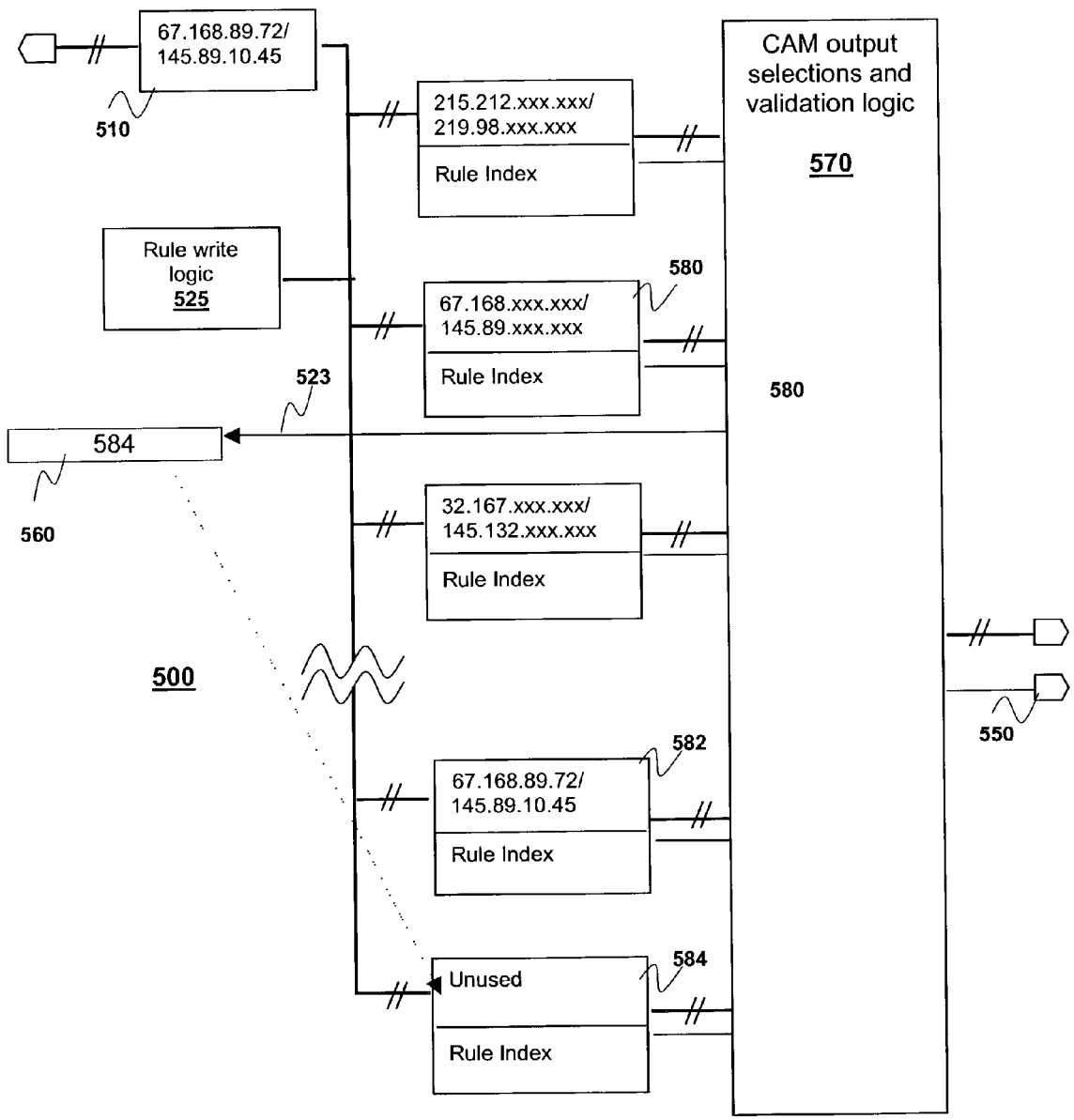
FIG. 5 illustrates one embodiment of a self validating CAM.

The forming of the new rule is unconditional in that it is formed regardless of what rules exist in the CAM 302 at the time the rule is presented to the CAM 302. For example, if a connection rule already exists using the same 64 bit source/destination address pair, the new rule is formed regardless and the new rule is written to the next available memory location. FIG. 5 illustrates a CAM device for unconditionally writing a rule and performing rule verification, in accordance with one embodiment. The rule is read and latched into comparand register 510. The value in the comparand register is compared against all existing rules. In this case, there will be a match to a routing rule 580 and a connection rule 582. However, in accordance with the present invention, regardless of the two matches, a new rule is written to the next available memory location 584 as indicated by pointer 560. After the connection rule is written to the new location 584, validation logic 570 determines if the connection rule is to be kept and validated. In this embodiment, validation logic 570 determines that a connection rule already exists 582. Resultantly, validation logic 570 does not validate the newly written information 584. This leaves memory location 584 available for writing when the next IP datagram's header information is written.

Figure 6:
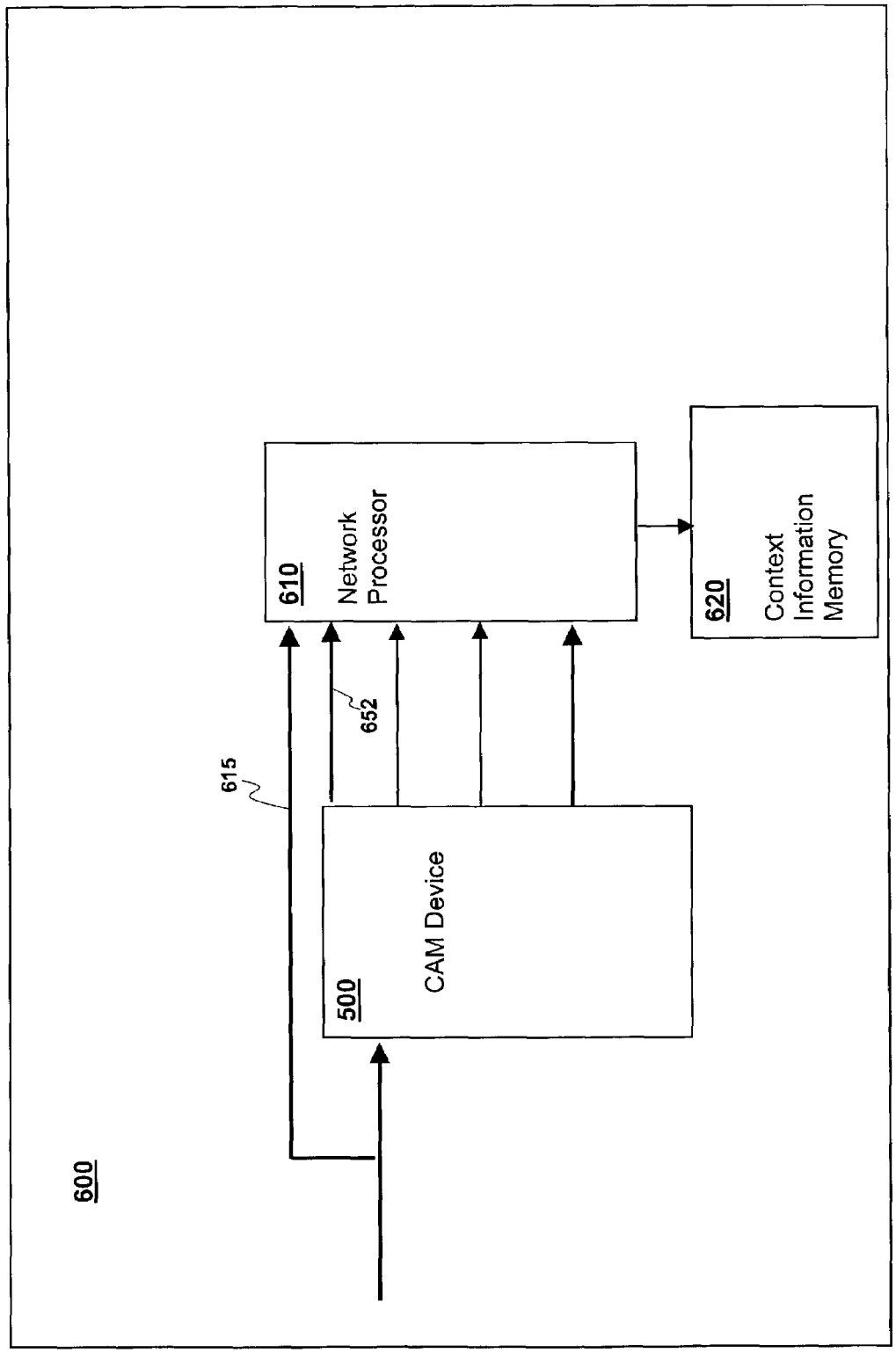
FIG. 6 illustrates a forwarding engine utilizing a self-validating CAM.

FIG. 6 shows an embodiment of a system utilizing a CAM device 500 where the index 652 is used as the context pointer, as earlier described referencing FIG. 5. In this embodiment, the network processor 610 will utilize the index 652 from the CAM device 500 to produce a location in the context information memory 620 where context information is located. In another embodiment, the index 652 is translated by other hardware resources to produce an address of the location in context memory of context information. In this system, there is no validation code input signals to the CAM device 500. Thus, unlike the embodiment shown in FIG. 3, there is no validation input signals to the CAM device 500. CAM device 500 contains validation selection logic 570 to perform self validation of newly written rules.

Figure 7:
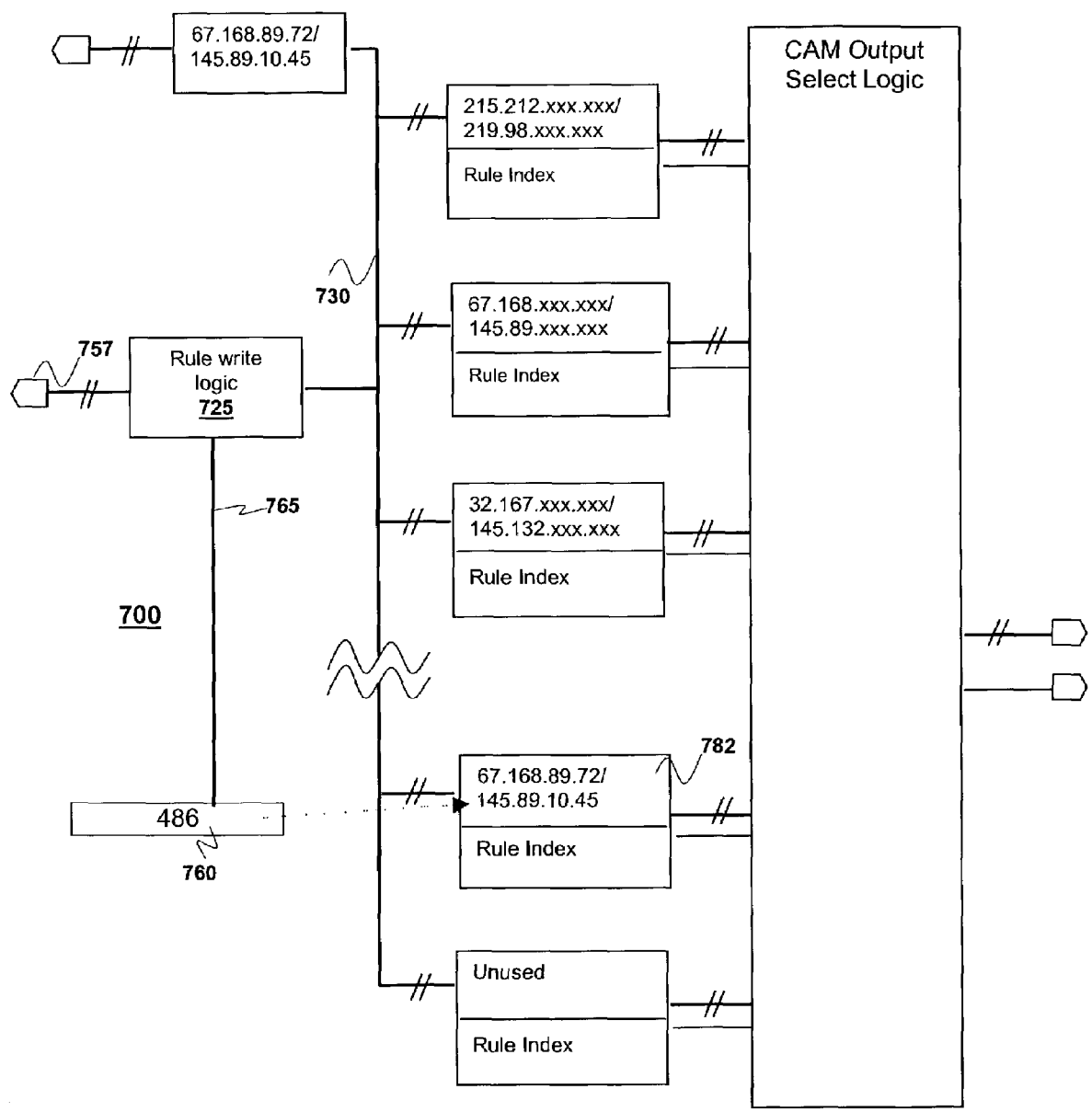
FIG. 7 illustrates one embodiment of the present invention showing validation input bits.

Refer now to FIGS. 3 and 7. As previously discussed, regardless of whether there is a match to an existing rule, the rule corresponding to the access key has already been written to the next available memory location 782. In the case where a determination had been made that there is a new connection (e.g. a routing rule was matched but no matching connection rule exists), network processor 310 creates a new context in context memory 320 to process subsequent datagrams of the connection as indicated by IP datagram's header 315. In one embodiment, since the new rule corresponding to the access key has already been written by rule write logic 725 to the CAM memory location 782, the network processor 310 must now only validate the new rule by passing a small number of validation bits 357 to the CAM. In the embodiment shown in FIG. 7, these validation bits are received by the CAM device at input port 757. In this embodiment, the validation bits are read by rule write logic 725 which will subsequently update the pointer 760 via bus 765. This validation process does not require the use of the CAM bus 730. Resultantly, the automated learning of the present invention reduces CAM bus 730 contention, and the negative consequences associated therewith.

A further advantage of the present invention is a reduction in the amount of redundant processing of new addressing pairs as indicated by a rule. For example, in the prior art, when a first instance of a rule arrived that was not matched, a network processor would process the first instance of the rule and eventually a CAM memory location would be populated with that rule and its corresponding pointer to context information. Any datagrams arriving subsequent to this first rule but prior to the writing of this rule, which contained a match to this same rule, e.g. a second instance of the rule, would also result in a non-match. This would cause a network processor to also begin processing this second instance. In such a case, processing bandwidth would be taken up in determining that, while there was no match on this second instance, there is a current effort to establish a context for this rule. This extra processing is not required by the present invention. In an even more pessimistic scenario, a non-match due to a delay in a rule being written to a CAM may result in two rules and two contexts existing for a single connection.

In accordance with the present invention, however, a match to an existing rule will result when any second instance of a rule arrives. This match results since a new rule is written at the time that this first instance of the new rule arrives at the CAM. Thus, since the second instance of the rule will result in a match, such a match will not cause a network processor to begin processing of a new connection in relation to this rule. This will result in decreased network processor bandwidth overhead.

Figure 8:
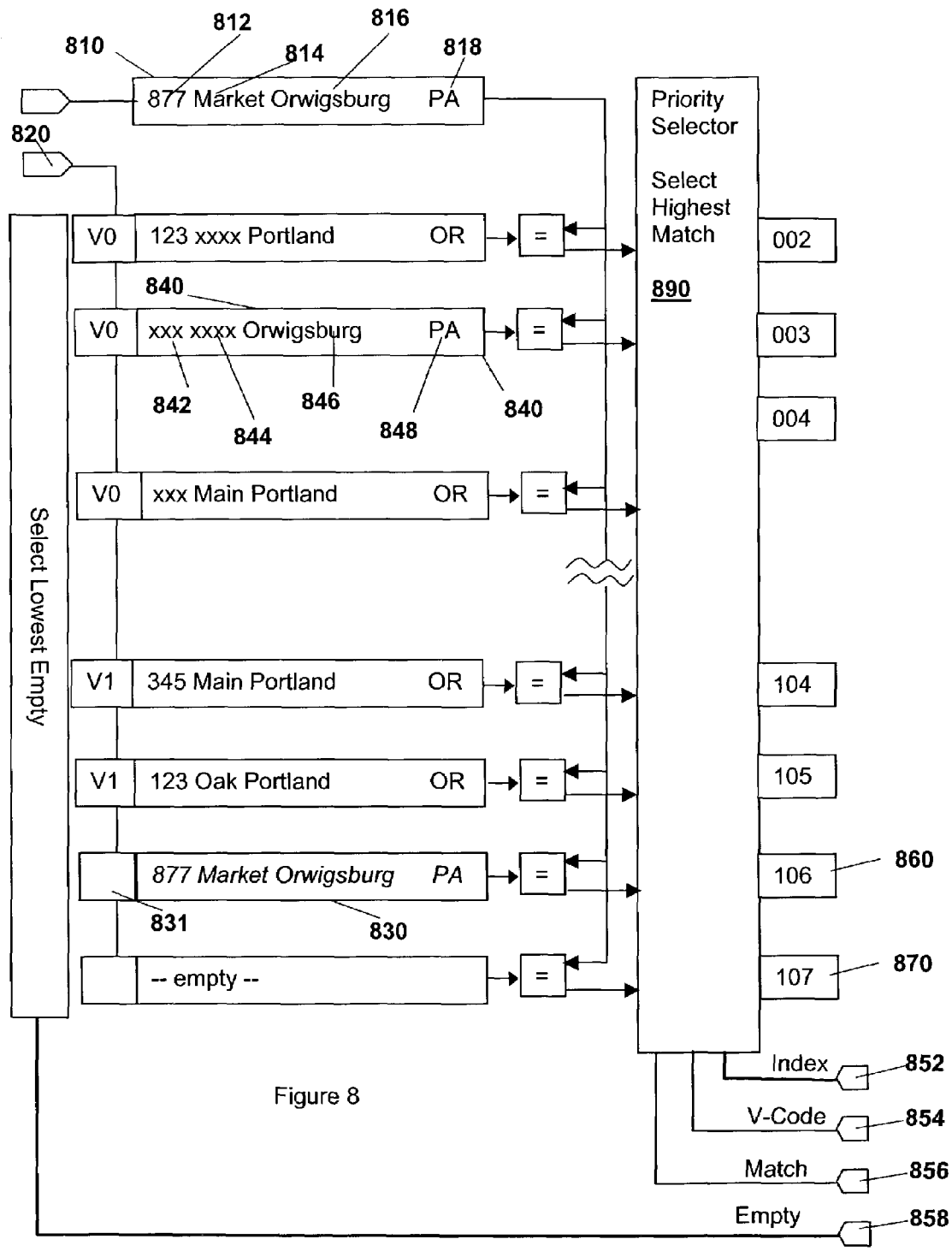
FIG. 8 illustrates a system using a CAM device with address of rule in CAM being utilized as a rule index.

FIG. 8 shows an architecture of an embodiment of the invention where the index of the rule is to be used as a context pointer by the system utilizing the CAM. In this embodiment, rules are written in an order in the device such that general rules, as indicated by a V0 validation code, appear at a lower address or index in the CAM. Similarly, in this embodiment, the specific rules, as indicated by a V1 validation code, reside at the higher memory locations. FIG. 8 shows the state of a CAM after a CAM key 810 is used to unconditionally write a new rule 830, but before the rule is validated by writing a validation code 831 for the rule. The CAM key 810 shown matches a single location 840 of the existing CAM entries. The masked values for the address street number 842 and street name 844 will match the "877" 812 and "Market" 814 of the key, respectively. Additionally, the city name 816 and state 818 in the key 810 are both exact matches to 846 and 848, respectively, to the rule 840. As a result of the match at the location corresponding to index 003, and the lack of a higher index match, the index 003, and the validation code, V0, will be provided to the appropriate outputs 852 and 854 of the CAM device. Additionally, the match bit 856 indicating that a match has occurred will be asserted. In this embodiment, there is a single class of general rules and a single class of specific rules. In such an embodiment, assuming that a match was found as indicated by the match signal 856, the validation bit, or v-code 854, is a single bit used to indicate whether the index provided was a specific or general rule. In another embodiment, multiple levels of rules exist and the validation code is multiple bits to provide such an identification.

Once the rule has been written to the first available memory location, "106" 860 in the example shown, the location written to is placed on the port 858, labeled empty. This provides an indication to other logic in the design of the location where the specific rule has been written and, consequently, which value will be used as the context pointer.

As described earlier and illustrated in FIG. 8, in this embodiment a validation port 820 is used to indicate to the CAM device 800 that a rule that has been written is to be maintained. In this embodiment, if a general or specific rule has been written and is to be validated, the proper code is written to the validation port 820 and the entry is kept. If the written rule is not to be kept, no validation code is written and the location in CAM is marked as empty as shown in location 107 870. In this embodiment, the validation port information for validating a written rule is processed after the rule is written but prior to the writing of a subsequent rule. In another embodiment, due to delays in processing by a network processor or other logic external to the CAM device, the validation information is not received by the CAM until a time subsequent to the beginning of the processing of a key that arrived subsequent to the one for whom the validation information is received. In this embodiment, additional validation logic is required to maintain validation signals with the appropriate written rules.

In the embodiment shown in FIG. 8, the rule is written to a CAM memory location 830 as it appears on the query port. These directly written rules are connection rules, i.e. exact matching rules that do not contain any masked values. In this embodiment, the routing rules, that is, the ones involving masked values, are general, static rules. These general rules are written by a network processor during system initialization and remain in the CAM for the duration of the operation of the system or until the network processor updates these values. In another embodiment, wherein more complex levels of rules than routing and connection are used, when a rule is to be written, more complex logic is used to perform the write. For example, masks or other logic can be used when writing the rules.

After writing the rule as shown in FIG. 8, when a subsequent key arrives that matches the specific key that was written to rule storage location 106, there will be a match to two locations. In this case, a match will occur to locations 003 and 106. The priority selector logic 890 will provide a match based on the highest location in the CAM rule storage location. Thus, in this embodiment, the index 106 will be placed on the index output 852.

Figure 9:
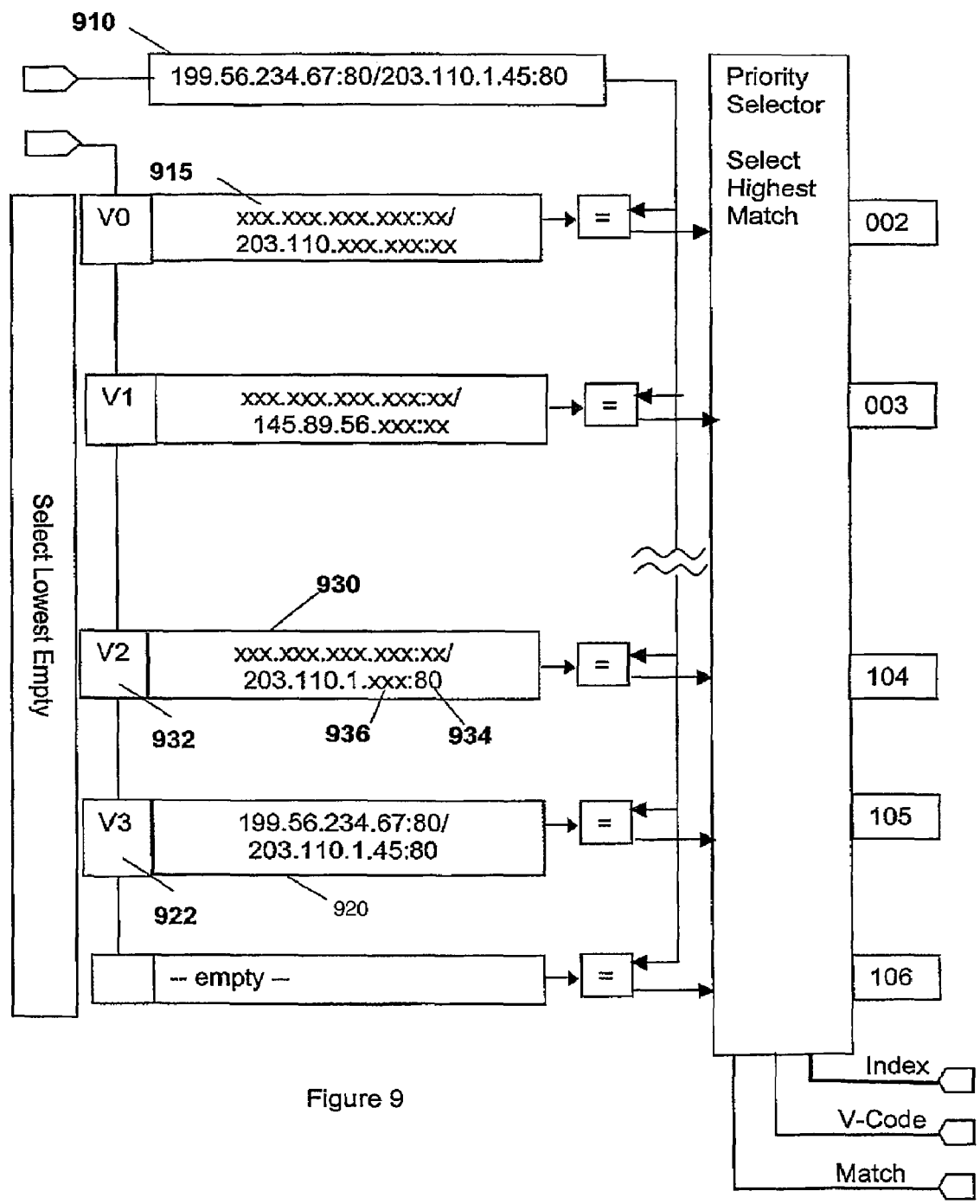
FIG. 9 illustrates an embodiment containing multilevel rules.

FIG. 9 shows an embodiment where an access key 910 has been presented to the CAM and two rules 920 930 have been unconditionally written. In this embodiment, the access key is a combination of the source and destination addresses for an IP packet, including the source and destination ports. The rules are written in accordance with preprogrammed instructions in the CAM device to unconditionally write specific rules 920 and to write general rules 930. Thus, in this embodiment, there is logic to write multiple rules with differing levels of specificity. The more general of the two written rules is a rule for all HTML traffic for a limited number of addresses, as indicated by the destination port "80" 934 and the masked bits of the lower eight bits of the destination address 936. This general rule 930, while more specific than a V0 rule 915, in this embodiment, is still more general than the specific written rule 920. In this embodiment, verification codes have multiple levels and logic external to the CAM will provide verification for the multiple rule write. For example, the specific rule 920 written to the CAM will have a verification code of "3", or "V3" 922, written to it. In additional, the more general rule 930 written to the CAM will have a verification code of "2", or "V2" 932, written to it.

CONCLUSION

Thus, it can be seen from the above descriptions, a novel Content Addressable Memory architecture having particular application in faster processing of network data is provided.

What is claimed is:

1. A content addressable memory (CAM) comprising:
a first plurality of storage locations to store a plurality of rules;
a second plurality of storage locations associated with and coupled to said first plurality of storage locations to store either a plurality of contexts correspondingly associated with the rules or a plurality of pointers correspondingly pointing to the corresponding contexts stored outside the CAM, wherein whether the second plurality of storage locations to store the plurality of contexts or the plurality of pointers is determined according to a quantity of context information to be stored;

first write logic coupled to said first plurality of storage locations to unconditionally write a new rule to a selected one of said first plurality of storage locations while accessing said first plurality of storage locations for one or more full or partial match of an access key, the access key being a subset of a datagram; and second write logic to write either a new context associated with the new rule, or a pointer to a new context associated with the new rule, into a selected one of the second plurality of storage locations, the new context being created in response to a partial match of the access key against one of said first plurality of storage locations.

2. The CAM of claim 1 wherein said selected one of said first plurality of storage locations is determined from a next available storage indicator.

3. The CAM of claim 1 wherein said first write logic further comprises a valid bit.

4. The CAM of claim 1 wherein said second write logic further comprises a valid bit.

5. The CAM of claim 4 wherein said valid bit is set upon said writing of said pointer to an execution context.

6. The CAM of claim 5 wherein said execution context contains information on one or more of a flow information and a processor assignment.

7. A Network Integrated Circuit comprising:
a content addressable memory (CAM) structure including a first plurality of storage locations to store a plurality of rules and a second plurality of storage locations associated with said first plurality of storage locations to store either a plurality of contexts correspondingly associated with the rules or a plurality of pointers correspondingly pointing to the corresponding contexts stored outside the CAM, wherein whether the second plurality of storage locations to store the plurality of contexts or to store the plurality of pointers is determined according to a quantity of context information to be stored;

a network processor coupled to the CAM structure; and
first write logic coupled to said first plurality of storage locations to unconditionally write a new rule to a selected one of said first plurality of storage locations while accessing said first plurality of storage locations for one or more full or partial match using an access key that is a subset of a datagram;

wherein said network processor is configured to create and store a new context associated with the new rule in the CAM structure or a pointer to a new context associated with the new rule if the new context is created outside of the CAM, in response to a partial match of the access key against one of said first plurality of storage locations.

8. The Network Integrated Circuit of claim 7 wherein the CAM structure supports multiple protocols.

9. The Network Integrated Circuit of claim 7 where the network processor includes second write logic coupled to said second plurality of storage locations to write a pointer to an execution context to an associated one of said second plurality of storage locations at a subsequent point in time to said access.

10. The Network Integrated Circuit of claim 7 wherein said selected one of said first plurality of storage locations is determined from a next available storage indicator.

11. The Network Integrated Circuit of claim 7 wherein said first write logic further comprises a valid bit.

12. The Network Integrated Circuit of claim 9 wherein said second write logic further comprises a valid bit.

13. The Network Integrated Circuit of claim 12 wherein said valid bit is set upon said writing of said pointer to said execution context.

14. The Network Integrated Circuit of claim 9 wherein said execution context includes information selected from one or more of a flow information and a processor assignment.

15. An apparatus comprising:
a switching fabric including a plurality of ingress/egress points to switch datagrams received through mediums coupled to the ingress/egress points; and
a network integrated circuit including:
a content addressable memory (CAM) structure including a first plurality of storage locations to store a plurality of rules and a second plurality of storage locations associated with said first plurality of storage locations to store either a plurality of contexts correspondingly associated with the rules or a plurality of pointers correspondingly pointing to a plurality of corresponding contexts stored outside the CAM, wherein whether the second plurality of storage locations to store the plurality of contexts or a plurality of pointers correspondingly pointing to the corresponding contexts stored outside the CAM is determined according to a quantity of context information to be stored;
a memory to store context information; and
first write logic coupled to said first plurality of storage locations to unconditionally write a new rule to a selected one of said first plurality of storage locations while accessing said first plurality of storage locations for one or more full or partial match using an access key that is a subset of a datagram; and
a network processor coupled to the CAM structure and the memory configured to create and store a new context associated with the new rule in the memory, or a pointer to a new context if the new context is created outside of the CAM, in response to a partial match of the access key against one of said first plurality of storage locations.

16. The networking apparatus of claim 15 wherein the CAM structure further includes second write logic coupled to said second plurality of storage locations to write a pointer to an execution context to a corresponding one of said second plurality of storage locations at a subsequent point in time to said access.

17. The networking apparatus of claim 15 wherein said selected one of said first plurality of storage locations is determined from a next available storage indicator.

18. The networking apparatus of claim 15 wherein said first write logic further comprises a valid bit.

19. The networking apparatus of claim 16 wherein said second write logic further comprises a valid bit.

20. The networking apparatus of claim 19 wherein said valid bit is set upon said writing of said pointer to said execution context.

21. The networking apparatus of claim 16 wherein said execution context includes information selected from one or more of a flow information and a processor assignment.

22. The networking apparatus of claim 15 wherein associated indices of said second plurality of storage location operate as context pointers.

23. A method comprising:
responsive to receipt of an access key that is a subset of a datagram, writing unconditionally at least a portion of a rule to a selected one of a first plurality of storage locations in a content addressable memory (CAM) structure;
accessing, while said writing unconditionally, the first plurality of storage locations for a full or a partial match using the access key; and creating and storing a new context or a pointer to a new context into a selected one of a second plurality of locations associated with and coupled to said first plurality of storage locations to point to the new context if the new context is created outside of the CAM in response to a partial match against one of said first plurality of storage locations, wherein whether the new context or a pointer to the new context is to be stored in the selected one of the second plurality of locations is determined according to a quantity of the new context.

24. The method as defined in claim 23 further comprising:

determining said selected one of the first plurality of storage locations from a next available storage indicator.

25. The method as defined in claim 24 further comprising:

adjusting said next available storage indicator to point to a free storage location in the first plurality of storage locations.

* * * * *

UNITED STATES PATENT AND TRADEMARK OFFICE
CERTIFICATE OF CORRECTION

| | |
|---|---|
| PATENT NO. | : 7,610,440 B2 |
| APPLICATION NO. | : 10/279154 |
| DATED | : October 27, 2009 |
| INVENTOR(S) | : Donald E. Husby |

It is certified that error appears in the above-identified patent and that said Letters Patent is hereby corrected as shown below:

In the Claims:

Col. 10, Claim 22 line 58, "storage location operate" should read --storage locations operate--

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

PATENT NO.       : 7,610,440 B2                    Page 1 of 1
APPLICATION NO.  : 10/279154
DATED            : October 27, 2009
INVENTOR(S)      : Donald E. Husby It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1042 days.

Signed and Sealed this

Fourteenth Day of December, 2010

David J. Kappos
*Director of the United States Patent and Trademark Office*